(No Model.)

T. L. BOSART.
BEARING FOR KING BOLTS FOR VEHICLES.

No. 590,251. Patented Sept. 21, 1897.

WITNESSES:
H. D. Nealy
J. A. Walsh

INVENTOR
Timothy L. Bosart,
BY
Chester L. Bradford,
ATTORNEY.

UNITED STATES PATENT OFFICE.

TIMOTHY L. BOSART, OF INDIANAPOLIS, INDIANA.

BEARING FOR KING-BOLTS FOR VEHICLES.

SPECIFICATION forming part of Letters Patent No. 590,251, dated September 21, 1897.

Application filed April 22, 1897. Serial No. 633,255. (No model.)

*To all whom it may concern:*

Be it known that I, TIMOTHY L. BOSART, a citizen of the United States, residing at Indianapolis, in the county of Marion and State of Indiana, have invented certain new and useful Improvements in Bearings for King-Bolts for Vehicles, of which the following is a specification.

The object of my said invention is to provide an inexpensive and easily-applied bearing which may be readily secured to any axle and to which the reach or draft irons may be easily secured by a simple king-bolt, all as will be hereinafter more particularly described and claimed.

Figure 1:
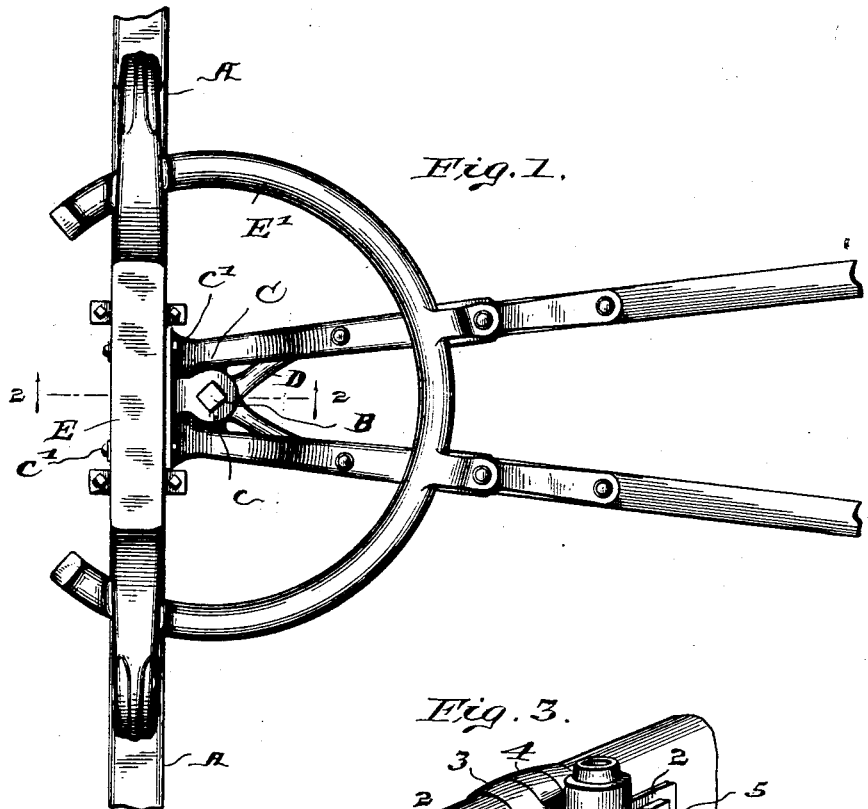
Figure 2:
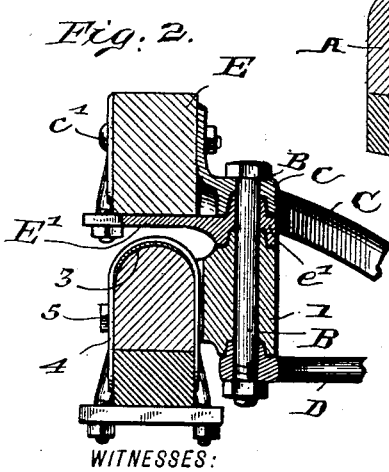
Figure 3:
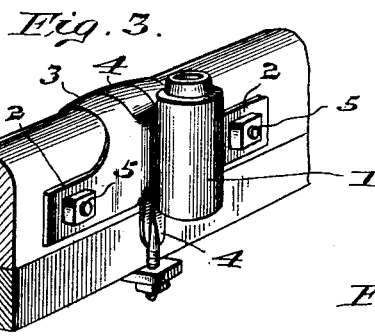
Figure 4:
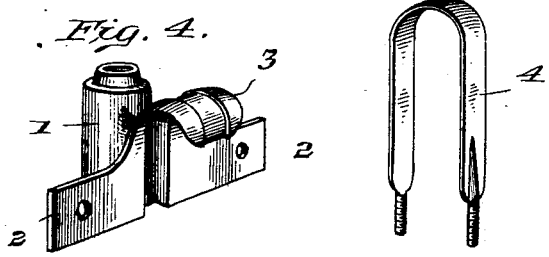
Figure 5:
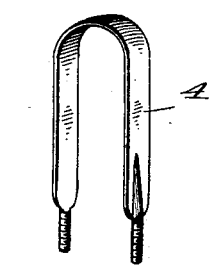

Referring to the accompanying drawings, which are made a part hereof and on which similar letters and figures of reference indicate similar parts, Figure 1 is a top or plan view of a fifth-wheel structure including fragments of the axle and reaches of a vehicle embodying my present invention; Fig. 2, a central sectional view as seen from the dotted line 2 2 in Fig. 1; Fig. 3, a perspective view of a fragment of an axle with my improved king-bolt bearing attached; Fig. 4, a perspective view from the opposite side of the king-bolt bearing separately, and Fig. 5 a perspective view of a clip for securing the same in place.

All the aforementioned parts are or may be of any desired construction except the king-bolt bearing. Said bearing consists of a sleeve-like portion 1, provided with wings 2 and a curved saddle-like extension 3, the latter being recessed centrally for the reception of a clip 4, which aids in securing the structure to the axle. Small securing-bolts 5 are also employed, passing through the wings 2 and the axle A. When the bearing is in place, it receives the king-bolt B, which passes through suitable bearings in a lug $c$ in the reach-irons C, a lug $e'$ on the upper fifth-wheel part E', said bearing 1, and the reach-iron D. The reach-iron C is also secured to the bolster E of the vehicle by bolts $c'$, as usual.

As will be seen, my device is extremely simple, easily applied, and very strong, and by its use the king-bolt is completely incased and protected. By a suitable cupping of the parts $c$, $e'$, 1, and D where they come together the king-bolt is also largely protected from wear.

Having thus fully described my said invention, what I claim as new, and desire to secure by Letters Patent, is—

The combination with the axle of a vehicle, of a king-bolt bearing consisting of a sleeve-like portion having wings extending out from its sides to be fastened to said axle, and a saddle-like extension on its upper side to engage the top of said axle, a recess being formed in the top of said extension and extending into an aperture between said sleeve and said axle, and a clip mounted in said recess and extending through said aperture, embracing said saddle-like portion and the axle, whereby said structure is firmly secured to the axle, substantially as set forth.

In witness whereof I have hereunto set my hand and seal, at Indianapolis, Indiana, this 19th day of April, A. D. 1897.

TIMOTHY L. BOSART. [L. S.]

Witnesses:
CHESTER BRADFORD,
JAMES A. WALSH.